(12) United States Patent
McCloskey et al.

(10) Patent No.: US 6,870,025 B2
(45) Date of Patent: Mar. 22, 2005

(54) METHOD OF POLYCARBONATE PREPARATION

(75) Inventors: Patrick Joseph McCloskey, Watervliet, NY (US); Jan Pleun Lens, Breda (NL); James Anthony Cella, Clifton Park, NY (US); Jan Henk Kamps, Bergen op Zoom (NL); Kathryn Lynn Longley, Saratoga Springs, NY (US); Narayan Ramesh, Niskayuna, NY (US); Warren William Reilly, Northville, NY (US); Paul Michael Smigelski, Jr., Schenectady, NY (US); Marc Brian Wisnudel, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 53 days.

(21) Appl. No.: 10/326,933

(22) Filed: Dec. 23, 2002

(65) Prior Publication Data

US 2003/0149223 A1 Aug. 7, 2003

Related U.S. Application Data

(63) Continuation-in-part of application No. 09/911,443, filed on Jul. 24, 2001, now Pat. No. 6,548,623.

(51) Int. Cl.$^7$ .............................................. C08G 64/00
(52) U.S. Cl. ...................... 528/196; 528/198; 264/219; 502/164
(58) Field of Search .................. 502/164; 528/196, 528/198; 264/219

(56) References Cited

U.S. PATENT DOCUMENTS

| | | |
|---|---|---|
| 4,323,668 A | 4/1982 | Brunelle |
| 5,336,751 A | 8/1994 | Raymond, III |
| 5,384,388 A | 1/1995 | Sakashita et al. |
| 5,405,933 A | 4/1995 | Sakashita et al. |
| 5,418,317 A | 5/1995 | Raymond, III |
| 5,420,192 A | 5/1995 | Ishiwa et al. |
| 5,510,450 A | 4/1996 | Sakashita et al. |
| 5,565,515 A | 10/1996 | Ishiwa et al. |
| 5,602,201 A | 2/1997 | Fujiguchi et al. |
| 5,606,009 A | 2/1997 | Sakashita et al. |
| 5,717,056 A | 2/1998 | Varadarajan et al. |
| 2004/0068086 A1 * | 4/2004 | Day et al. .................. 528/196 |

FOREIGN PATENT DOCUMENTS

| | | |
|---|---|---|
| EP | 360578 | 9/1989 |
| EP | 0508775 | 4/1992 |
| EP | 0508774 | 9/1992 |
| EP | 746673 | 11/1993 |
| EP | 0 719 815 | 7/1996 |
| EP | 0 982 341 | 3/2000 |
| JP | 11302228 | 2/1989 |
| JP | 10101786 | 4/1998 |
| JP | 6436497 | 11/1999 |
| WO | 9947580 | 9/1999 |
| WO | 0063274 | 10/2000 |
| WO | WO 03/106149 | 12/2003 |

OTHER PUBLICATIONS

PCT Search Report dated Jun. 2, 2004.

* cited by examiner

*Primary Examiner*—Terressa Boykin
(74) *Attorney, Agent, or Firm*—Andrew J. Caruso; Patrick K. Patnode

(57) ABSTRACT

Polycarbonates containing low or undetectable levels of Fries rearrangement products and comprising repeat units derived from one or more of resorcinol, hydroquinone, methylhydroquinone, bisphenol A, and 4,4'-biphenol have been prepared by the melt reaction of one or more of the aforementioned dihydroxy aromatic compounds with an ester-substituted diaryl carbonate such as bis-methyl salicyl carbonate. Low, or in many instances undetectable, levels of Fries rearrangement products are found in the product polycarbonates obtained as the combined result of a highly effective catalyst system which suppresses the Fries reaction and the use of lower melt polymerization temperatures relative to temperatures required for the analogous polymerization reactions using diphenyl carbonate.

53 Claims, No Drawings

METHOD OF POLYCARBONATE PREPARATION

RELATED APPLICATION

This application is a continuation-in-part of U.S. application Ser. No. 09/911,443, filed Jul. 24, 2001, now U.S. Pat. No. 6,548,623, which is incorporated herein by reference.

BACKGROUND OF THE INVENTION

This invention relates to the preparation of polycarbonates by the melt reaction of a dihydroxy aromatic compound with an ester-substituted diaryl carbonate. More particularly, the instant invention relates to the formation under mild conditions of polycarbonates having extremely low levels of Fries rearrangement products and possessing a high level of endcapping.

Polycarbonates, such as bisphenol A polycarbonate, are typically prepared either by interfacial or melt polymerization methods. The reaction of a bisphenol such as bisphenol A (BPA) with phosgene in the presence of water, a solvent such as methylene chloride, an acid acceptor such as sodium hydroxide and a phase transfer catalyst such as triethylamine is typical of the interfacial methodology. The reaction of bisphenol A with a source of carbonate units such as diphenyl carbonate at high temperature in the presence of a catalyst such as sodium hydroxide is typical of currently employed melt polymerization methods. Each method is practiced on a large scale commercially and each presents significant drawbacks.

The interfacial method for making polycarbonate has several inherent disadvantages. First it is a disadvantage to operate a process which requires phosgene as a reactant due to obvious safety concerns. Second it is a disadvantage to operate a process, which requires using large amounts of an organic solvent because expensive precautions must be taken to guard against any adverse environmental impact. Third, the interfacial method requires a relatively large amount of equipment and capital investment. Fourth, the polycarbonate produced by the interfacial process is prone to having inconsistent color, higher levels of particulates, and higher chloride content, which can cause corrosion.

The melt method, although obviating the need for phosgene or a solvent such as methylene chloride requires high temperatures and relatively long reaction times. As a result, by-products may be formed at high temperature, such as the products arising by Fries rearrangement of carbonate units along the growing polymer chains. Fries rearrangement gives rise to undesired and uncontrolled polymer branching which may negatively impact the polymer's flow properties and performance.

Some years ago, it was reported in U.S. Pat. No. 4,323,668 that polycarbonate could be formed under relatively mild conditions by reacting a bisphenol such as BPA with the diaryl carbonate formed by reaction of phosgene with methyl salicylate. The method used relatively high levels of transesterification catalysts such as lithium stearate in order to achieve high molecular weight polycarbonate. High catalyst loadings are particularly undesirable in melt polycarbonate reactions since the catalyst remains in the product polycarbonate following the reaction. The presence of a transesterification catalyst in a the polycarbonate may shorten the useful life span of articles made therefrom by promoting increased water absorption, polymer degradation at high temperatures and discoloration.

It would be desirable, therefore, to minimize the amount of catalyst required in the for the melt preparation of polycarbonate from bisphenols and ester substituted diaryl carbonates such as bis-methyl salicyl carbonate. The present invention provides a method which confers these and other advantages upon the preparation of polycarbonate via the melt polymerization process.

BRIEF SUMMARY OF THE INVENTION

The present invention provides a method of preparing a polycarbonate, said method comprising heating a mixture comprising a catalyst, at least one diaryl carbonate having structure I

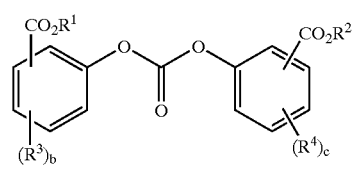

wherein

R$^1$ and R$^2$ are independently C$_1$–C$_{20}$ alkyl radicals, C$_4$–C$_{20}$ cycloalkyl radicals, or C$_4$–C$_{20}$ aromatic radicals, R$^3$ and R$^4$ are independently at each occurrence a halogen atom, cyano group, nitro group, C$_1$–C$_{20}$ alkyl radical, C$_4$–C$_{20}$ cycloalkyl radical, C$_4$–C$_{20}$ aromatic radical, C$_1$–C$_{20}$ alkoxy radical, C$_4$–C$_{20}$ cycloalkoxy radical, C$_4$–C$_{20}$ aryloxy radical, C$_1$–C$_{20}$ alkylthio radical, C$_4$–C$_{20}$ cycloalkylthio radical, C$_4$–C$_{20}$ arylthio radical, C$_1$–C$_{20}$ alkylsulfinyl radical, C$_4$–C$_{20}$ cycloalkylsulfinyl radical, C$_4$–C$_{20}$ arylsulfinyl radical, C$_1$–C$_{20}$ alkylsulfonyl radical, C$_4$–C$_{20}$ cycloalkylsulfonyl radical, C$_4$–C$_{20}$ arylsulfonyl radical, C$_1$–C$_{20}$ alkoxycarbonyl radical, C$_4$–C$_{20}$ cycloalkoxycarbonyl radical, C$_4$–C$_{20}$ aryloxycarbonyl radical, C$_2$–C$_{60}$ alkylamino radical, C$_6$–C$_{60}$ cycloalkylamino radical, C$_5$–C$_{60}$ arylamino radical, C$_1$–C$_{40}$ alkylaminocarbonyl radical, C$_4$–C$_{40}$ cycloalkylaminocarbonyl radical, C$_4$–C$_{40}$ arylaminocarbonyl radical, or C$_1$–C$_{20}$ acylamino radical, and b and c are independently integers 0–4;

and at least one dihydroxy aromatic compound selected from the group consisting of resorcinol, methylresorcinol, hydroquinone, and methylhydroquinone, said catalyst comprising at least one source of alkaline earth ions or alkali metal ions, and at least one quaternary ammonium compound, quaternary phosphonium compound, or a mixture thereof, said source of alkaline earth ions or alkali metal ions being present in an amount such that between about $1 \times 10^{-5}$ and about $1 \times 10^{-8}$ moles of alkaline earth metal ions or alkali metal ions are present in the mixture per mole of dihydroxy aromatic compound employed, said quaternary ammonium compound, quaternary phosphonium compound, or mixture thereof being present in an amount between about $2.5 \times 10^{-3}$ and about $1 \times 10^{-6}$ moles per mole of dihydroxy aromatic compound employed, to provide a product polycarbonate, said product polycarbonate comprising repeat units derived from at least one member of the group consisting of resorcinol, methylresorcinol, hydroquinone, and methylhydroquinone.

The present invention further relates to a method for forming polycarbonates by reaction of an ester-substituted diaryl carbonate in which the level of Fries rearrangement product in the product polycarbonate is less than about 1000 parts per million (ppm) and the level of internal ester carbonate linkages in the product polycarbonate is less than about 1 percent of the total number of moles of dihydroxy aromatic compound employed and the level of terminal hydroxy ester groups in the product polycarbonate is less than about 1 percent of the total number of moles of dihydroxy aromatic compound employed.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester carbonates.

As used herein, the term "melt polycarbonate" refers to a polycarbonate made by the transesterification of a diaryl carbonate with at least one dihydroxy aromatic compound.

"BPA" is herein defined as bisphenol A or 2,2-bis(4-hydroxyphenyl)propane.

As used herein the terms "4,4'-dihydroxy-1,1-biphenyl" and "4,4'-biphenol" have the same meaning and refer to the same compound (CAS No. 92-88-6).

As used herein the term "methylresorcinol" refers to any one of the three isomers of methylresorcinol, 2-methylresorcinol, 4-methylresorcinol, and 5-methyresorcinol. The 5-methyl isomer of resorcinol, 5-methyl resorcinol, is also known as orcinol.

"Catalyst system" as used herein refers to the catalyst or catalysts that catalyze the transesterification of the bisphenol with the diaryl carbonate in the melt process.

As used herein, the terms "dihydroxy aromatic compound", "bisphenol", "diphenol" and "dihydric phenol" are synonymous.

"Catalytically effective amount" refers to the amount of the catalyst at which catalytic performance is exhibited.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, among the Fries products within the product polycarbonate are those structural units, for example structure VIII below, which afford 2-carboxy bisphenol A upon complete hydrolysis of the product polycarbonate.

The terms "Fries product" and "Fries group" are used interchangeably herein.

The terms "Fries reaction" and "Fries rearrangement" are used interchangeably herein.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

In the present invention it has been discovered that extremely low levels of catalyst may be employed to prepare polycarbonate using the melt reaction of an ester substituted diaryl carbonate with a dihydroxy aromatic compound. The use of very low catalyst loadings is desirable from at least two perspectives. First, the use of low catalyst levels during melt polymerization tends to suppress the formation of undesired Fries rearrangement products. Second, because residual catalyst present in the polymer tends to decrease the useful life-span of articles made from it by increasing water absorption, decreasing thermal stability and promoting discoloration, its minimization is desirable. The polycarbonate prepared by the method of the present invention is typically free of, or contains undetectable levels of Fries rearrangement products. Moreover, in the absence of an added exogenous monofunctional phenol the product polycarbonate is very highly endcapped with less than 50% of the endgroups being free hydroxyl groups. Where an exogenous monofunctional phenol is added to the polymerization mixture, high levels of incorporation of said phenol are observed. In this manner both the identity of the polymer endgroups and the polymer molecular weight may be controlled in the melt reaction.

In the process of the present invention an ester-substituted diaryl carbonate having structure I is reacted under melt reaction conditions with at least one dihydroxy aromatic compound in the presence of at least one source of alkaline earth ions or alkali metal ions, and an organic ammonium compound or an organic phosphonium compound, or a combination thereof. Ester-substituted diaryl carbonates I are exemplified by bis-methyl salicyl carbonate (CAS Registry No. 82091-12-1), bis-ethyl salicyl carbonate, bis-propyl salicyl carbonate, bis-butyl salicyl carbonate, bis-benzyl salicyl carbonate, bis-methyl 4-chlorosalicyl carbonate and the like. Typically bis-methyl salicyl carbonate is preferred.

The dihydroxy aromatic compounds used according to the method of the present invention include at least one dihydroxy aromatic compound selected from the group consisting of resorcinol, methylresorcinol, hydroquinone, and methylhydroquinone. The product polycarbonate prepared according to the method of the present invention thus comprises repeat units derived from at least one member of the group consisting of resorcinol, methylresorcinol, hydroquinone, and methylhydroquinone. The present invention provides a method for the preparation of homopolycarbonates, and polycarbonates comprising repeat units derived from two or more dihydroxy aromatic compounds.

The polycarbonates prepared according to the method of the present invention may further comprise repeat units derived from a variety of dihydroxy aromatic compounds in addition to resorcinol, methylresorcinol, hydroquinone, and methylhydroquinone. For example, polycarbonates prepared according to the method of the present invention may also comprise repeat units derived from dihydroxy aromatic compounds selected from the group consisting of bisphenols having structure II,

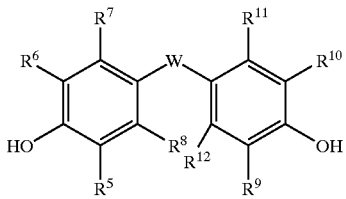

II wherein $R^5$–$R^{12}$ are independently a hydrogen atom, halogen atom, nitro group, cyano group, $C_1$–$C_{20}$ alkyl radical, $C_4$–$C_{20}$ cycloalkyl radical, or $C_6$–$C_{20}$ aryl radical, W is a bond, an oxygen atom, a sulfur atom, a $SO_2$ group, a $C_6$–$C_{20}$ aromatic radical, a $C_6$–$C_{20}$ cycloaliphatic radical, or the group

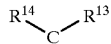

wherein $R^{13}$ and $R^{14}$ are independently a hydrogen atom, $C_1$–$C_{20}$ alkyl radical, $C_4$–$C_{20}$ cycloalkyl radical, or $C_4$–$C_{20}$ aryl radical, or $R^{13}$ and $R^{14}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or combination thereof;

dihydroxy benzenes having structure III

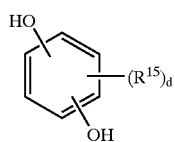

III wherein $R^{15}$ is independently at each occurrence a hydrogen atom, halogen atom, nitro group, cyano group, $C_2$–$C_{20}$ alkyl radical, $C_4$–$C_{20}$ cycloalkyl radical, or a $C_4$–$C_{20}$ aryl radical, and d is an integer from 1 to 4; and dihydroxy naphthalenes having structures IV and V

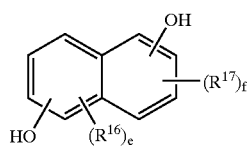

IV

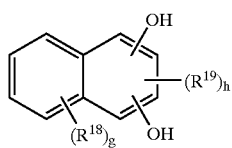

V wherein $R^{16}$, $R^{17}$, $R^{18}$ and $R^{19}$ are independently at each occurrence a hydrogen atom, halogen atom, nitro group, cyano group, $C_1$–$C_{20}$ alkyl radical, $C_4$–$C_{20}$ cycloalkyl radical, or a $C_4$–$C_{20}$ aryl radical, e and f are integers of from 0 to 3, g is an integer from 0 to 4, and h is an integer from 0 to 2.

Suitable bisphenols II are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-sec-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-bromo-4-hydroxy-5-methylphenyl)cyclohexane; 1,1-bis(3-chloro-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo- 5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl (4,4'-biphenol); 4,4'-dihydroxy-3, 3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, 1,4-bis(2-(4-hydroxy-3-methylphenyl)-2-propyl)benzene; bis(4-hydroxyphenyl)methane; 1,1-bis(4-hydroxyphenyl)ethane; 2,2-bis(4-hydroxyphenyl)butane;. 2,2-bis(4-hydroxyphenyl) octane; and 1,1-bis(4-hydroxyphenyl)cyclopentane;

Suitable dihydroxy benzenes III are illustrated by 5-phenyl resorcinol, 5-butylresorcinol, 2-hexylresorcinol, 4-hexylresorcinol, 5-hexylresorcinol, ethylhydroquinone, butylhydroquinone, hexylhydroquinone, phenylhydroquinone, 4-phenylresorcinol, and 4-ethylresorcinol.

Suitable dihydroxy naphthalenes IV are illustrated by 2,6-dihydroxynaphthalene; 2,6-dihydroxy-3-methylnaphthalene; and 2,6-dihydroxy-3-phenylnaphthalene.

Suitable dihydroxy naphthalenes V are illustrated by 1,4-dihydroxynaphthalene; 1,4-dihydroxy-2-methylnaphthalene; 1,4-dihydroxy-2-phenylnaphthalene and 1,3-dihydroxynaphthalene.

The catalyst used in the method of the present invention comprises at least one source of alkaline earth ions or alkali metal ions, and at least one quaternary ammonium compound, quaternary phosphonium compound, or a mixture thereof, said source of alkaline earth ions or alkali metal ions being used in an amount such that the amount of alkaline earth or alkali metal ions present in the reaction mixture is in a range between about $1 \times 10^{-5}$ and about $1 \times 10^{-8}$ moles alkaline earth or alkali metal ion per mole of dihydroxy aromatic compound employed.

The quaternary ammonium compound is selected from the group of organic ammonium compounds having structure VI

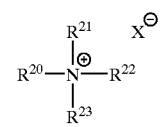

VI wherein $R^{20}$–$R^{23}$ are independently a $C_4$–$C_{20}$ alkyl radical, $C_4$–$C_{20}$ cycloalkyl radical, or a $C_4$–$C_{20}$ aryl radical, and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Suitable organic ammonium compounds comprising structure VI are illustrated by tetramethylammonium hydroxide, tetrabutylammonium hydroxide, tetramethylammonium acetate, tetramethylammonium formate and tetrabutylammonium acetate.

The quaternary phosphonium compound is selected from the group of organic phosphonium compounds having structure VII

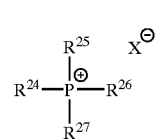

VII wherein $R^{24}$–$R^{27}$ are independently a $C_1$–$C_{20}$ alkyl radical, $C_4$–$C_{20}$ cycloalkyl radical, or a $C_4$–$C_{20}$ aryl radical, and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate.

Suitable organic phosphonium compounds comprising structure VII are illustrated by tetramethylphosphonium hydroxide, tetramethylphosphonium acetate, tetramethylphosphonium formate, tetrabutylphosphonium hydroxide, and tetrabutylphosphonium acetate.

Where $X^-$ is a polyvalent anion such as carbonate or sulfate it is understood that the positive and negative charges in structures VI and VII are properly balanced. For example, where $R^{20}$–$R^{23}$ in structure VI are each methyl groups and $X^-$ is carbonate, it is understood that $X^-$ represents ½ $(CO_3^{-2})$.

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide, and potassium hydroxide. Other sources of alkaline earth and alkali metal ions include salts of carboxylic acids, such as sodium acetate, and derivatives of ethylene diamine tetraacetic acid (EDTA) such as EDTA tetrasodium salt, and EDTA magnesium disodium salt.

In the method of the present invention an ester-substituted diaryl carbonate I, at least one dihydroxy aromatic compound selected from the group consisting of resorcinol, methylresorcinol, hydroquinone and methylhydroquinone, and a catalyst are contacted in a reactor suitable for conducting melt polymerization. The relative amounts of ester-substituted diaryl carbonate and dihydroxy aromatic compound are such that the molar ratio of diaryl carbonate I to dihydroxy aromatic compound is in a range between about 1.20 and about 0.8, preferably between about 1.10 and about 0.9 and still more preferably between about 1.05 and about 1.01.

The amount of catalyst employed is such that the amount of alkaline earth metal ion or alkali metal ions present in the reaction mixture is in a range between about $1 \times 10^{-5}$ and about $1 \times 10^{-8}$, preferably between about $5 \times 10^{-5}$ and about $1 \times 10^{-7}$, and still more preferably between about $5 \times 10^{-5}$ and about $5 \times 10^{-7}$ moles of alkaline earth metal ion or alkali metal ion per mole dihydroxy aromatic compound employed. The quaternary ammonium compound, quaternary phosphonium compound or a mixture thereof is used in an amount corresponding to about $2.5 \times 10^{-3}$ and $1 \times 10^{-6}$ moles per mole dihydroxy aromatic compound employed.

Typically the ester-substituted diaryl carbonate, one or more dihydroxy aromatic compounds and the catalyst are combined in a reactor which has been treated to remove adventitious contaminants capable of catalyzing both the transesterification and Fries reactions observed in uncontrolled melt polymerizations of diaryl carbonates with dihydroxy aromatic compounds. Contaminants such as sodium ion adhering to the walls of a glass lined reactor are typical and may be removed by soaking the reactor in mild acid, for example 3 normal hydrochloric acid, followed by removal of the acid and soaking the reactor in high purity water, such as deionized water.

In one embodiment of the present invention an ester-substituted diaryl carbonate, such as bis-methyl salicyl carbonate, one or more dihydroxy aromatic compounds, and a catalyst comprising alkali metal ions, such as sodium hydroxide, and a quaternary ammonium compound, such as tetramethylammonium hydroxide, or a quaternary phosphonium compound, such as tetrabutylphosphonium acetate, are charged to a reactor and the reactor is purged with an inert gas such as nitrogen or helium. The reactor is then heated to a temperature in a range between about 100° C. and about 340° C., preferably between about 100° C. and about 280° C., and still more preferably between about 140° C. and about 240° C. for a period of from about 0.25 to about 5 hours, preferably from about 0.25 to about 2 hours, and still more preferably from about 0.25 hours to about 1.25 hours. While the reaction mixture is heated the pressure over the reaction mixture is gradually reduced from ambient pressure to a final pressure in a range between about 0.001 mmHg and about 400 mmHg, preferably 0.01 mmHg and about 100 mmHg, and still more preferably about 0.1 mmHg and about 10 mmHg.

Control of the pressure over the reaction mixture allows the orderly removal of the phenolic by-product formed when the dihydroxy aromatic compound undergoes a transesterification reaction with a species capable of releasing a phenolic by-product, for example bis-methyl salicyl carbonate or a growing polymer chain endcapped by a methyl salicyl group. As noted above the reaction may be conducted at subambient pressure. In an alternate embodiment of the present invention, the reaction may be conducted at slightly elevated pressure, for example a pressure in a range between about 1 and about 2 atmospheres.

As noted, the use of excessive amounts of catalyst may adversely affect the structure and properties of a polycarbonate prepared under melt polymerization conditions. The present invention provides a method of melt polymerization employing a highly effective catalyst system comprising at least one source of alkaline earth or alkali metal ions, and a quaternary ammonium compound or quaternary phosphonium compound, or mixture thereof which provides useful reaction rates at very low catalyst concentrations, thereby minimizing the amount of residual catalyst remaining in the product polycarbonate. Limiting the amount of catalyst employed according to the method of the present invention provides a new and useful means of controlling the structural integrity of the product polycarbonate as well. Thus, in one embodiment, the method of the present invention provides a product polycarbonate having a weight average molecular weight, as determined by gel permeation chromatography, in a range between about 10,000 and about 100,000 Daltons, preferably between about 15,000 and about 60,000 Daltons, and still more preferably between about 15,000 and about 50,000 Daltons said product polycarbonate having less than about 1000, preferably less than about 500, and still more preferably less than about 100 parts per million (ppm) Fries product. Structure VIII illustrates the Fries product structure present in a polycarbonate prepared from bisphenol A.

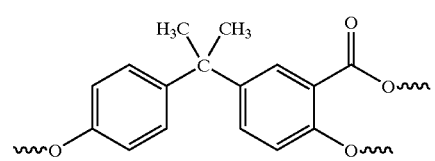

VIII

As indicated, the Fries product may serve as a site for polymer branching, the wavy lines indicating polymer chain structure.

In addition to providing a product polycarbonate containing only very low levels of Fries products, the method of the present invention provides polycarbonates containing very low levels of other undesirable structural features which arise from side reactions taking place during melt the polymerization reaction between ester-substituted diaryl carbonates I and dihydroxy aromatic compounds. One such undesirable structural feature has structure IX and is termed an internal ester-carbonate linkage. In structure IX "$R^3$" and "b" are defined as in structure I. Structure IX is thought to arise by reaction of an ester-substituted phenol by-product, for example methyl salicylate, at its ester carbonyl group with a dihydroxy aromatic compound or a hydroxy group of a growing polymer chain. Further reaction of the ester-substituted phenolic hydroxy group leads to formation of

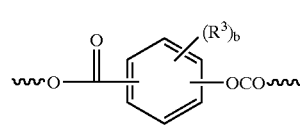

IX a carbonate linkage. Thus, the ester-substituted phenol by-product of reaction of an ester-substituted diaryl carbonate with a dihydroxy aromatic compound, may be incorporated into the main chain of a linear polycarbonate. The presence of uncontrolled amounts of ester carbonate linkages in the polycarbonate polymer chain is undesirable.

Another undesirable structural feature present in melt polymerization reactions between ester-substituted diaryl carbonates and dihydroxy aromatic compounds is the ester-linked terminal group having structure X which possesses a free hydroxyl group. In structure X "$R^3$" and "b" are defined as in structure I. Structure X is thought to arise in the same manner as structure IX but without further reaction of the ester-substituted phenolic hydroxy

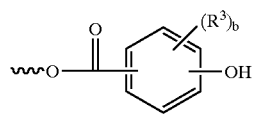

X group. The presence of uncontrolled amounts of hydroxy terminated groups such as X is undesirable. In structures VIII, IX and X the wavy line shown as represents the product polycarbonate polymer chain structure.

The present invention, in sharp contrast to known methods of effecting the melt polymerization of an ester-substituted diaryl carbonate and a dihydroxy aromatic compound, provides a means of limiting the formation of internal ester-carbonate linkages having structure IX as well as ester-linked terminal groups having structure X, during melt polymerization. Thus in a product polycarbonate prepared using the method of the present invention structures, IX and X, when present, represent less than 1 mole percent of the total amount of all structural units present in the product polymer derived from dihydroxy aromatic compounds employed as starting materials for the polymer synthesis.

An additional advantage of the method of the present invention over earlier methods of melt polymerization of ester-substituted diaryl carbonates and dihydroxy aromatic compounds, derives from the fact that the product polymer is endcapped with ester-substituted phenoxy endgroups and contains very low levels, less than about 50 percent, preferably less than about 10 percent, and still more preferably less than about 1 percent, of polymer chain ends bearing free hydroxy groups. The ester substituted terminal groups are sufficiently reactive to allow their displacement by other phenols such as p-cumylphenol. Thus, following the melt polymerization the product polycarbonate may be treated with one or more exogenous phenols to afford a polycarbonate incorporating endgroups derived from the exogenous phenol. The reaction of the ester substituted terminal groups with the exogenous phenol may be carried out in a first formed polymer melt or in a separate step.

In one embodiment of the present invention an exogenous monofunctional phenol, for example p-cumylphenol, is added at the outset of the reaction between the ester substituted diaryl carbonate and the dihydroxy aromatic compound. The product polycarbonate then contains endgroups derived from the exogenous monofunctional phenol. The exogenous monofunctional phenol serves both to control the molecular weight of the product polycarbonate and to determine the identity of the polymer endgroups. The exogenous monofunctional phenol may be added in amounts ranging from about 0.1 to about 10 mole percent, preferably from about 0.5 to about 8 mole percent and still more preferably from about 1 to about 6 mole percent based on the total number of moles of dihydroxyaromatic compound employed in the polymerization. Additional catalyst is not required apart from the catalytically effective amount added to effect the polymerization reaction. Suitable exogenous monofunctional phenols are exemplified by p-cumylphenol; 2,6-xylenol; 4-t-butylphenol; p-cresol; 1-naphthol; 2-naphthol; cardanol; 3,5-di-t-butylphenol; p-nonylphenol; p-octadecylphenol; and phenol. In alternative embodiments of the present invention the exogenous monofunctional phenol may be added at an intermediate stage of the polymerization or after its completion. In such alternative embodiments the exogenous phenol may exert a controlling effect upon the molecular weight of the product polycarbonate and will control the identity of the polymer terminal groups.

The present invention may be used to prepare polycarbonate products having very low levels (less than 1 ppm) of trace contaminants such as iron, chloride ion, and sodium ion. Where such extremely low levels of trace contaminants is desired it is sufficient to practice the invention using starting materials, ester-substituted diary carbonate and dihydroxy aromatic compound having correspondingly low levels of the trace contaminants in question. For example, the preparation bisphenol A polycarbonate containing less than 1 ppm each of iron, chloride ion and sodium ion may be made by the method of the present invention using starting materials bis-methyl salicyl carbonate and bisphenol A containing less than 1 ppm iron, chloride ion and sodium ion.

The method of the present invention can be conducted as a batch or a continuous process. Any desired apparatus can be used for the reaction. The material and the structure of the reactor used in the present invention is not particularly limited as long as the reactor has an ordinary capability of stirring and the presence of adventitious catalysts can be controlled. It is preferable that the reactor is capable of stirring in high viscosity conditions as the viscosity of the reaction system is increased in later stages of the reaction.

Polycarbonates prepared using the method of the present invention may be blended with conventional additives such as heat stabilizers, mold release agents and UV stabilizers and molded into various molded articles such as optical disks, optical lenses, automobile lamp components and the like. Further, the polycarbonates prepared using the method of the present invention may be blended with other polymeric materials, for example, other polycarbonates, polyestercarbonates, polyesters and olefin polymers such as ABS. In one embodiment a polycarbonate prepared by the method of the present invention is blended with one or more polymeric substances to form a polymer bend which may then molded into a molded article. Thus in one aspect, the present invention comprises a molded article prepared from a polymer blend comprising a polycarbonate prepared by the method of the present invention. Molded articles are exemplified by compact disks, automobile headlamp covers, football helmets and the like.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

General Experimental Methods

Molecular weights are reported as number average ($M_n$) or weight average ($M_w$) molecular weight and were determined by gel permeation chromatography (GPC), and, unless otherwise indicated, were determined using a polycarbonate molecular weight standard to construct a broad standard calibration curve against which polymer molecular weights were determined. The temperature of the gel permeation columns was about 25° C. and the mobile phase was chloroform.

Fries content was measured by the KOH methanolysis of resin and is reported as parts per million (ppm). The Fries content for each of the melt polycarbonates listed in Table 1 was determined as follows. First, 0.50 grams of polycarbonate was dissolved in 4.0 ml of THF (containing p-terphenyl as internal standard). Next, 3.0 ml of 18% KOH in methanol was added to this solution. The resulting mixture was stirred for two hours at ambient temperature. Next, 1.0 ml of acetic acid was added, and the mixture was stirred for 5 minutes. Potassium acetate by-product was allowed to crystallize over 1 hour. The solid was filtered off and the resulting filtrate was analyzed by liquid chromatography using p-terphenyl as the internal standard.

Internal ester-carbonate and terminal hydroxy-ester groups were measured by $^{13}C$- and $^{31}P$-NMR respectively. Terminal hydroxy ester groups were first derivatized with 2-chloro-1, 3, 2-dioxaphospholane (Aldrich).

Melt polymerization reactions were typically run in a 100 mL glass reactor adapted for distillation under vacuum. The reactor was equipped with a solid nickel helical agitator. The reactor was configured such that by-product phenol or methyl salicylate could be distilled out of the reaction vessel and condensed in a chilled receiving vessel. Prior to its use, the reactor was soaked in 3N HCl for a period of 12 hours and was then soaked for an additional 12 hours in deionized water (18-Mohm) and placed in a drying oven overnight. Reaction temperature was controlled by immersion of the reactor into a fluidized sand bath equipped with a PID temperature controller. The temperature of the sand bath was monitored at the reactor sand bath interface. The pressure of the reaction vessel was controlled by means of a vacuum pump coupled to a nitrogen bleed. The pressure within the reactor was measured with an MKS pirani gauge. Sodium hydroxide (J. T. Baker, $1\times10^{-6}$ mole per mole dihydroxy aromatic compound) and tetramethylammonium hydroxide (Sachem, $2.5\times10^{-4}$ mole per mole dihydroxy aromatic compound) or tetrabutylphosphonium acetate (Sachem, $2.5\times10^{-4}$ mole per mole dihydroxy aromatic compound) were added as solutions in deionized (18 Mohm) water. Where the catalyst level was varied, the concentration of the catalyst solution was adjusted such that the volume of water introduced in the catalyst introduction step was held constant.

Examples 1–3 and Comparative Examples 1–4

The reactor was charged at ambient temperature and pressure with solid bisphenol A (General Electric Plastics Japan Ltd., 0.08761 mol) and solid bis-methyl salicyl carbonate (0.0880–0.0916 mol) or solid diphenyl carbonate (General Electric Plastics Japan Ltd., 0.0946 mol). In some instances a monofunctional phenol such as p-cumylphenol (0.0027–0.0088 mol) was added in order to limit the molecular weight of the polymer and control chain endgroup identity. The catalyst was then injected into the bisphenol A layer and the reactor was assembled. The reactor was then evacuated briefly and nitrogen was reintroduced. This step was repeated three times. The reactor was then lowered into the sand bath maintained at 180° C. After a five minute period stirring at 250 rpm was initiated. After a total of 10 minutes the reaction mixture had fully melted. The temperature of the bath was raised to 210° C. over a five minute period. The pressure in the reactor was then reduced to 180 mmHg at which point the phenolic by-product began to distill from the reaction vessel into the receiving vessel. The reaction mixture was held at 210° C. and 180 mmHg for 20 minutes. The pressure was then lowered to 100 mmHg stirred for an additional 20 minutes after which time the temperature was raised to 240° C. over a five minute period. The pressure was then lowered to 15 mmHg and the reaction mixture was stirred at 240° C. at 15 mmHg for 20 minutes. The temperature was then raised to 270° C. over a five minute period and the pressure was then lowered to 2 mmHg. The reaction mixture was stirred at 270° C. at 2 mmHg for 10 minutes. The temperature was then raised to 310° C. over a ten minute period and the pressure was lowered to 1.1 mmHg. The reaction mixture was stirred at 310° C. at 1.1 mmHg for 30 minutes after which the reaction vessel was raised from the sand bath and the molten product polymer was scooped from the reaction vessel into a liquid nitrogen bath in order to quench the reaction.

Data for Examples 1–3 and Comparative Examples 1–5 are gathered in Table 1 and illustrate the utility of the method of the present invention. In the Comparative Examples 1–5 and Examples 1–3 no p-cumylphenol was added as a chain-stopper. The column heading "DAC" indicates which diaryl carbonate was employed. "DPC" is diphenyl carbonate used in Comparative-Example 1 (CE-1). "BMSC" is bis-methyl salicyl carbonate. The ratio "DAC/BPA" represents the initial molar ratio of diaryl carbonate to bisphenol A employed in the reaction. "$M_n$" represents number average molecular weight of the product polymer. "Fries level" indicates the concentration of Fries rearrangement product present in the product polymer. Fries levels were determined by complete solvolysis (KOH catalyzed methanolysis) of the product polymer and quantitative measurement of the amount of Fries product, 2-carboxybisphenol A (CAS No. 101949-49-9), present by HPLC. "EC (%)" represents the percentage of polymer chain ends not terminating in a hydroxyl group. Hydroxyl endgroup concentrations were determined by quantitative infrared spectroscopy. Phenol and salicyl endgroups were determined by HPLC analysis after product solvolysis.

TABLE 1

REACTION OF BPA WITH DIARYLCARBONATE (DAC)

| Example | DAC | DAC/BPA | $M_n$ | Fries level | EC (%) |
|---|---|---|---|---|---|
| CE-1 | DPC | 1.08 | 6250 | 946 | 41% |
| Example 1 | BMSC | 1.08 | 4293 | not detected | >99% |
| Example 2 | BMSC | 1.04 | 8499 | not detected | >99% |
| Example 3 | BMSC | 1.02 | 13762 | not detected | 98% |
| CE-2[1] | BMSC | 1.04 | 7683 | 43 | |
| CE-3[2] | BMSC | 1.04 | 7892 | 282 | |
| CE-4[3] | BMSC | 1.04 | gel | 8502 | |
| CE-5[3] | BMSC | 1.0 | 5910 | 98 | 47% |

[1] Catalyst was NaOH at $1 \times 10^{-6}$ mole per mole BPA
[2] Catalyst was tetrabutylphosphonium acetate at $2.5 \times 10^{-4}$ mole per mole BPA
[3] Catalyst was lithium stearate at $1 \times 10^{-3}$ moles per mole BPA Comparative Example 1 highlights differences between melt polymerization behavior of DPC and BMSC in reactions with bisphenol A. Melt polymerization using BMSC (Example 1) affords an undetectable level of Fries product and a very high level of endcapping, whereas melt polymerization using DPC under the same conditions using the same catalyst as that used in Example 1 leads to a high level (946 ppm) of Fries product and a far lower endcapping level. Examples 1–3 illustrate the melt polymerization of BMSC with BPA according to the method of the present invention which affords polycarbonate containing undetectable levels of Fries product and very high endcapping levels.

According to the method of the present invention the catalyst comprises at least one source of alkaline earth ions or alkali metal ions, and at least one quaternary ammonium compound, quaternary phosphonium compound, or a mixture thereof. Comparative Examples 2 and 3 illustrate this requirement. In Comparative Example 2, a source of alkali metal ions, NaOH, was present but no quaternary ammonium compound or quaternary phosphonium compound was present. In Comparative Example 3, a quaternary phosphonium compound, tetrabutylphosphonium acetate, was present but no source of alkali metal ions was present. In both instances detectable levels of Fries product were observed.

The data in Table 1 further illustrate the superiority of the method of the present invention over earlier polymerization methods using BMSC. Comparative Examples 4 and 5 show the effect of using lithium stearate at a level ($1 \times 10^{-3}$ mole per mole BPA) taught by U.S. Pat. No. 4,323,668. Comparative Example 4 was run using the protocol used in Examples 1–3 and the product polycarbonate showed such a high level of Fries product that its molecular weight could not be determined due to the very high level of branching which occurred. The product polycarbonate was recovered as a gel which could not be dissolved for gel permeation chromatography. Comparative Example 5 was run under a milder temperature regime, the maximum temperature was 260° C. (See below), than that used in Examples 1–3 and Comparative Examples 1–4, yet nonetheless the product polymer contained a significant amount of Fries product, 98 ppm.

Comparative Example No. 5 (CE-5, Table 1)

The reactor, equipped and passivated as described above, was charged at ambient temperature and pressure with solid bisphenol A (General Electric Plastics Japan Ltd., 0.100 mole) and solid bis-methyl salicyl carbonate (0.100 mole). Lithium stearate catalyst (Kodak, $1 \times 10^{-3}$ mole per mole bisphenol A) was added as a solid and the reactor was assembled. The reactor was then evacuated briefly and nitrogen was reintroduced. The degassing step was repeated three times. The reactor was then lowered into the sand bath maintained at 150° C. After a five minute period stirring at 250 rpm was initiated. These conditions were maintained for 60 minutes. The temperature of the bath was then raised to 260° C. The pressure in the reactor was then reduced to 10 mmHg at which point the methyl salicylate by-product began to distill from the reaction vessel into the receiving vessel. The reaction mixture was held at 260° C. and 10 mmHg for 10 minutes after which the reaction vessel was raised from the sand bath and the molten product polymer was scooped from the reaction vessel into a liquid nitrogen bath in order to quench the reaction. The product polycarbonate was characterized by gel permeation chromatography and found to have $M_w$=14353 and $M_n$=5910. The level of Fries product was determined to be 98 ppm.

As noted, it has been found that the inclusion of an exogenous phenol such as p-cumylphenol in the melt reaction of a bisphenol with an ester-substituted diaryl carbonate according to the method of the present invention affords polycarbonate containing p-cumylphenol endgroups. Data are gathered in Table 2 which demonstrate the surprising efficiency of this transformation relative to the analogous reaction using diphenyl carbonate (DPC). Comparative Example 7 illustrates the low levels of PCP incorporation in the product polycarbonate encountered when a mixture of a bisphenol, DPC and an endcapping agent, p-cumylphenol (PCP) are reacted in the melt. Conversely, Example 5 conducted utilizing the method of the present invention reveals a high level of PCP incorporation. In the polycarbonate product formed in Comparative Example 7 roughly half of the endgroups were found by NMR to be derived from PCP and half derived from phenol.

TABLE 2

REACTION OF BPA WITH DAC IN THE PRESENCE OF PCP

| Example | DAC | DAC/BPA | PCP | $M_n$ | EC (%) | % PCP |
|---|---|---|---|---|---|---|
| CE-6 | DPC | 1.08 | — | 6250 | 41% | — |
| CE-7 | DPC | 1.08 | 3.05 | 5674 | 60% | 25% |
| Example 4 | BMSC | 1.04 | — | 8499 | 100% | — |
| Example 5 | BMSC | 1.03 | 5.07 | 9744 | 99% | 97% |

Examples 6–12 Polycarbonate Formation (BPA-Resorcinol)

Example 6

A glass reactor equipped as described in the General Experimental Methods section which had been previously passivated by acid washing, rinsing and drying with nitrogen gas, was charged with 12.15 g of BPA, 1.46 g of resorcinol, 25.01 g of BMSC, and 100 μl of an aqueous solution of TMAH ($2.5 \times 10^{-4}$ moles per mole BPA and resorcinol combined) and NaOH ($1.5 \times 10^{-6}$ moles per mole BPA and resorcinol combined). Polymerization was carried out as described in Examples 1–3 in the following stages: Stage (1) 15 minutes (min), 180° C., atmospheric pressure, Stage (2) 45 min, 230° C., 170 mbar, Stage (3) 30 min, 270° C., 20 mbar, and Stage (4) 30 min, 300° C., 0.5-1.5 mbar. After the final reaction stage, the polymer was sampled from the reaction tube. The percent resorcinol (resorcinol is referred to here as the comonomer) incorporated into the product polycarbonate was determined by complete hydrolysis of the product polycarbonate followed by HPLC assay of the amount of resorcinol and BPA present in the hydrolysis product. The result of this HPLC assay was consistent with a polycarbonate comprising repeat units derived from BPA and resorcinol in a molar ratio of about 82 percent BPA and about 18 percent resorcinol. Thus, approximately 90.3 percent of the resorcinol monomer was incorporated into the product polycarbonate The product polycarbonate was further characterized by gel permeation chromatography.

Example 7

The polymerization reaction was carried out as in Example 6 but differed in the amount of BMSC used and in the polymerization conditions employed. Reagents used were 12.15 g of BPA, 1.47 g of resorcinol, and 22.60 g of BMSC. The catalyst was added in 100 µl of an aqueous solution of tetrabutylphosphonium acetate (TBPA, $2.5\times10^{-4}$ per mole BPA and resorcinol combined) and sodium hydroxide (NaOH, $1.5\times10^{-6}$ per mole BPA and resorcinol combined). The polymerization was carried out in the following stages: Stage (1) 15 min, 180° C., atmospheric pressure, Stage (2) 15 min, 220° C., 100 mbar, and Stage (3) 10 min, 280° C., 0.5–1.5 mbar. The product polycarbonate was characterized by gel permeation chromatography. The percent resorcinol incorporated into the product polycarbonate was determined as in Example 6. The HPLC assay was consistent with a polycarbonate comprising repeat units derived from BPA and resorcinol in a molar ratio of about 81 percent BPA and about 19 percent resorcinol. Thus, approximately 94 percent of the resorcinol monomer was incorporated into the product polycarbonate Comparative Example 8

The polymerization was carried out as in Example 7 however diphenyl carbonate (DPC) was used instead of BMSC. The amounts of each reagent were 19.73 g of BPA, 2.38 g of resorcinol, and 25.00 g of DPC. The catalyst was TMAH ($2.5\times10^{-4}$ per mole BPA and resorcinol combined) and sodium hydroxide (NaOH, $1.5\times10^{-6}$ per mole BPA and resorcinol combined). The polymerization was carried out in four stages: Stage (1) 15 min, 180° C., atmospheric pressure, Stage (2) 60 min, 230° C., 170 mbar, Stage (3) 30 min, 270° C., 20 mbar, and Stage (4) 30 min, 300° C., 0.5–1.5 mbar. The product polycarbonate was characterized as in Example 6. The HPLC assay was consistent with a polycarbonate comprising repeat units derived from BPA and resorcinol in a molar ratio of about 87 percent BPA and about 13 percent resorcinol. Thus, approximately 65 percent of the resorcinol monomer was incorporated into the product polycarbonate and about 35 percent of the resorcinol monomer was lost as phenol and excess diphenyl carbonate distilled from the polymerization mixture.

Example 8

A glass reactor passivated and equipped as described in the General Experimental Methods section was charged with 158.37 g of BPA, 19.10 g of resorcinol, and 295.00 g of BMSC. The catalyst consisted of ethylenediamine tetracarboxylic acid disodium magnesium salt (EDTAMgNa$_2$) and TBPA. The EDTAMgNa$_2$ was added (173 µl) as a 0.001 molar solution in water. TBPA was added in an amount corresponding to about $2.5\times10^{-4}$ moles TBPA per mole BPA and resorcinol combined. The reactants were oligomerized in the following stages: In Stage (1) the reactants were heated and stirred under an inert atmosphere for 30 minutes at about 220° C. at atmospheric pressure. This was followed by a Stage (2) in which the temperature was maintained at about 220° C. while the pressure in the reactor was gradually reduced over a period of 20 to 30 minutes to about 30 mbar and afforded a solution of the oligomeric polycarbonate in methyl salicylate. (Methyl salicylate was formed as the by-product of the oligomerization reaction.) The mixture was heated at 220° C. and 30 mbar until approximately 80% of the methyl salicylate by-product was removed. The percent resorcinol comonomer incorporated in the product oligomeric polycarbonate was determined as in Example 6. The HPLC assay was consistent with an oligomeric polycarbonate comprising repeat units derived from BPA and resorcinol in a molar ratio of about 81 percent BPA and about 19 percent resorcinol. Thus, approximately 95 percent of the resorcinol monomer was incorporated into the product oligomeric polycarbonate. The product oligomeric polycarbonate was further characterized by gel permeation chromatography and was shown to have a weight average molecular weight, $M_w$, of about 8800 Daltons relative to polystyrene molecular weight standards.

Example 9

An oligomeric polycarbonate prepared as in Example 8 (but on a larger scale) having a weight average molecular weight, $M_w$, of about 8800 daltons was ground to a powder and extruded on a WE 20 mm twin screw extruder with three heating zones spanning a temperature range of from about 275° C. to about 300° C. The extruder was equipped with two vacuum venting ports to remove methyl salicylate by-product. The temperature of the product polycarbonate was about 300° C. at the extruder dieface. The residence time in the extruder was approximately 2 minutes during which time the lower molecular weight oligomeric polycarbonate was converted to higher molecular weight polycarbonate. The product polycarbonate was characterized by gel permeation chromatography and was found to have a weight average molecular weight of about 20,000 Daltons.

Example 10

The polycarbonate prepared by extrusion in Example 9 (the polycarbonate extrudate) (35.0 g) was placed in a passivated glass reactor equipped as in the General Experimental Methods section and was resubjected to melt polymerization conditions under the following conditions: Stage (1) 15 min, 260° C., atmospheric pressure, Stage (2) 15 min, 280° C., 20–0 mbar, and Stage (3) 30 min, 280° C., 0.5 mbar. The product polycarbonate was characterized by gel permeation chromatography and was found to have a weight average molecular weight of about 26,400 Daltons.

Example 11

The procedure of Example 10 was repeated in an identical fashion except that an additional amount of the metal ion containing catalyst component (30 µl EDTAMgNa$_2$ (0.001M)) was added to the reaction. The product polycarbonate was characterized by gel permeation chromatography and was found to have a weight average molecular weight of about 35,900 Daltons.

Example 12

The oligomeric polycarbonate prepared in Example 8 ($M_w$=8800 Daltons, 35.0 g) was placed in a passivated glass reactor equipped as in the General Experimental Methods section and was resubjected to melt polymerization conditions under the following conditions: Stage (1) 15 min, 260° C., atmospheric pressure, Stage (2) 15 min, 280° C., 20–0 mbar, and Stage (3) 30 min, 280° C., 0.5 mbar. The product polycarbonate was characterized by gel permeation chromatography and was found to have a weight average molecular weight of about 20,800 Daltons.

TABLE 3

PREPARATION OF BPA-RESORCINOL POLYCARBONATES

| Example | Comonomer | % BPA:% Comonomer | DAC | DAC/DHA[1] | $M_w^2$ | % Comonomer incorporation |
|---|---|---|---|---|---|---|
| Example 6 | resorcinol | 80:20 | BMSC | 1.14 | 8400 | 90.3% |
| Example 7 | resorcinol | 80:20 | BMSC | 1.03 | 37200 | 94.0% |
| CE-8 | resorcinol | 80:20 | DPC | 1.08 | 36500 | 65.4% |
| Example 8 | resorcinol | 80:20 | BMSC | 1.03 | 8800 | 95.2% |
| Example 9[3] | — | — | — | — | 20000 | — |
| Example 10[4] | — | — | — | — | 26400 | — |
| Example 11[5] | — | — | — | — | 35900 | — |
| Example 12[6] | — | — | — | — | 20800 | — |

[1]Ratio of diaryl carbonate (DAC) to moles of all dihydroxy aromatic compounds (DHA) initially charged.
[2]Weight Average molecular weight expressed in Daltons are relative to polystyrene molecular weight standards
[3]The starting material was an oligomeric polycarbonate prepared as in Example 8.
[4]The starting material was the extruded polycarbonate prepared in Example 9.
[5]The starting material was the extruded polycarbonate prepared in Example 9 to which additional catalyst was added.
[6]The starting material was the same oligomeric polycarbonate prepared in Example 8.

Examples 6–8 and Comparative Example 8 illustrate an important advantage of the method of the present invention. When BMSC, an ester substituted diaryl carbonate, was used according to the method of the present invention, very high levels of comonomer incorporation into the product polycarbonate were observed (Example 6: 90.3%, Example 7: 94%, Example 8: 95.2%). These high levels of comonomer incorporation into the product polycarbonate were achieved notwithstanding the high volatility of resorcinol. The results of Examples 6–8 stand in sharp contrast to the result in Comparative Example 8 (CE-8) wherein much of the initially charged resorcinol comonomer was entrained along with by-product phenol out of the reaction mixture before it could react and become incorporated into the product polycarbonate. Thus, only 65.4 percent of the initially charged resorcinol was incorporated into the product polycarbonate when diphenyl carbonate (DPC) was used instead of an ester substituted diaryl carbonate such as BMSC.

Examples 13–18 and Comparative Examples 9 and 10 Polycarbonate Formation (BPA-Hydroquinone)

The following general experimental procedure was employed in the preparation of polycarbonates comprising structural units derived from BPA and hydroquinone (HQ). The melt polymerization reactions were carried out in a passivated glass reactor equipped as in the General Experimental Methods section. Reactants, BMSC, BPA and HQ, were charged to the reactor at room temperature. The reactor was then evacuated and flushed with nitrogen three times. The molar ratios given in Table 4 are expressed as the moles of BMSC per mole of BPA and HQ combined. For example, for a polymerization reaction carried out using 1.5 moles of bis-methyl salicyl carbonate (BMSC), 1.3 moles of bisphenol A (BPA), and 0.17 moles of hydroquinone (HQ), the molar ratio of BMSC per mole of BPA and HQ combined would be (1.5 moles BMSC)/(1.3 moles BPA+0.17 moles HQ), or 1.02 moles BMSC per mole of BPA and HQ "combined". In Examples 13–18 the molar ratio ranging of BMSC to BPA and HQ combined was between 1.017–1.038 moles of BMSC for each mole of BPA and HQ combined. The combined weight of reactants charged to the reactor was sufficient to produce from about 100 to about 200 grams (g) of product polycarbonate. The alkali metal ion-containing catalyst component was added to the reactor as a 0.005 molar solution of EDTAMgNa$_2$ in water in an amount corresponding to concentration of 1×10$^{-6}$ mole EDTAMgNa$_2$ per mole of BPA and HQ combined. The quaternary phosphonium compound catalyst component was added as a 40 weight percent solution of TBPA in water in an amount corresponding to 2.5×10$^{-4}$ moles of TBPA per mole of BPA and HQ combined. The melt polymerization reaction was carried out in stages as follows: Stage (1) the reactants were melted and equilibrated at atmospheric pressure under nitrogen at about 180 to about 220° C., Stage (2) vacuum was applied and methyl salicylate was distilled from the reaction mixture, Stage (3) the polymerization reaction was "finished" by heating at a final temperature in a range between about 280 and about 300° C. under high vacuum (less than 1 torr). Molecular weights are given in Daltons and were determined by gel permeation chromatography (GPC) relative to polycarbonate molecular weight standards. Compositions in which more than about 40 percent of the repeat units were derived from HQ were insufficiently soluble in chloroform to permit molecular weight measurement by GPC without the addition of hexafluoroisopropanol to the analytical sample comprising the product polycarbonate and chloroform. Levels of residual methyl salicylate in the product polycarbonates were determined by gas chromatography. The percent hydroquinone comonomer incorporated in the product polycarbonate was determined by $^1$H-NMR.

Data for Examples 13–18 and Comparative Examples 9 and 10 are gathered in Table 4 below. The data reveal that that the ratio of BPA to hydroquinone initially charged to the reactor was charged was faithfully reproduced in the composition of the polycarbonate. In general, high levels of incorporation into the polycarbonate of the relatively volatile HQ were observed. Polycarbonate compositions were prepared in which between about 10 and about 50 mole percent of all repeat units were derived from HQ. Polycarbonate compositions comprising BPA and HQ wherein the repeat units derived from HQ comprise more than about 50 mole percent of all repeat units present in the polycarbonate were found to be crystalline. The data further show that only relatively low levels of residual methyl salicylate are present in the product polycarbonate. The polycarbonates of Comparative Examples 9 and 10 were prepared by the same general method used in Examples 13–18 with the exception that diphenyl carbonate (DPC) was used instead of BMSC.

TABLE 4

PREPARATION OF BPA-HYDROQUINONE POLYCARBONATES

| Example | % BPA/ % HQ[1] | DAC/ DHA[2] | $M_w^3$ | $M_n^3$ | $M_w/M_n$ | Tg °C. | % EC[4] | MS[5] (ppm) | % Comonomer incorporation |
|---|---|---|---|---|---|---|---|---|---|
| Example 13 | 90:10 | 1.017 | 38000 | 15900 | 2.39 | 149 | 97 | 19 | 92% |
| Example 14 | 80:20 | 1.028 | 29300 | 11800 | 2.48 | 144 | >99 | nd[6] | 95% |
| Example 15 | 80:20 | 1.030 | 23900 | 1020 | 2.34 | 142 | >99 | nd | 95% |
| Example 16 | 80:20 | 1.033 | 21100 | 9300 | 2.27 | 139 | nd | nd | 100% |
| Example 17 | 60:40 | 1.035 | 19800 | 9000 | 2.20 | 133 | >99 | 15 | 94% |
| Example 18 | 50:50 | 1.038 | 20900 | 6900 | 3.03 | 136 | nd | nd | nd |
| CE-9 | 80:20 | 1.100 | 15200 | 7200 | 2.11 | nd | >87 | 15[7] | 100% |
| CE-10 | 80:20 | 1.030 | 20200 | 10100 | 2.00 | nd | 42 | 20[7] | 100% |

[1]Mole percentages of BPA and HQ initially charged to the reactor.
[2]Ratio of diaryl carbonate (DAC) to moles of all dihydroxy aromatic compounds (DHA) initially charged.
[3]Weight Average and Number Average molecular weights expressed in Daltons are relative to polystyrene molecular weight standards
[4]"% EC" indicates the percent of product polymer chain ends not terminated by a hydroxyl group.
[5]"MS (ppm)" indicates the amount of residual methyl salicylate (MS) by-product present in the product polycarbonate given in parts per million (ppm).
[6]"nd" indicates that the given value was not determined for the indicated polycarbonate
[7]For Comparative Examples 9 and 10 (CE-9 and CE-10) which were prepared with diphenyl carbonate instead of BMSC the values appearing under the heading "MS (ppm)" indicate the amount of residual phenol by-product present in the product polycarbonate given in parts per million (ppm).

Examples 19–26 Polycarbonate Terpolymers (Resorcinol Hydroquinone, 4,4'-Biphenol, Methylhydroquinone, BPA)

Polycarbonate terpolymers comprising repeat units from at least three dihydroxy aromatic compounds selected from the group consisting of resorcinol, hydroquinone, 4,4'-biphenol, methylhydroquinone, and bisphenol A were prepared using the same general method delineated in Examples 13–18. Compositions prepared and relevant physical data are gathered in Table 5 below.

TABLE 5

PREPARATION OF POLYCARBONATE TERPOLYMERS

| Example | Mole % R[1] | Mole % HQ | Mole % BiP[2] | Mole % MHQ[3] | Mole % BPA | $M_w$, $M_n^4$ | Tg, Tm (° C.) |
|---|---|---|---|---|---|---|---|
| Example 19 | 20 | 20 | 0 | 60 | 0 | nd[5] | 93, 244 |
| Example 20 | 20 | 40 | 0 | 40 | 0 | nd | 97, 265 |
| Example 21 | 0 | 33 | 0 | 33 | 34 | 25200, 11200 | 125, no Tm[6] |
| Example 22 | 0 | 60 | 0 | 10 | 30 | nd | 131, 320 |
| Example 23 | 0 | 0 | 33 | 33 | 34 | 34500, 15900 | 141, no Tm |
| Example 24 | 0 | 0 | 20 | 60 | 20 | 25200, 11500 | 117, no Tm |
| Example 25 | 10 | 50 | 0 | 0 | 40 | 18400, 7300 | 125, 290 |
| Example 26 | 20 | 40 | 0 | 0 | 40 | 21300, 9100 | 121, no Tm |

[1]"R" denotes resorcinol.
[2]"BiP" denotes 4,4'-biphenol.
[3]"MHQ" denotes methylhydroquinone
[4]$M_w$ and $M_n$ denote the Weight Average molecular and Number Average molecular weight respectively of the product terpolymers and the values are expressed in Daltons relative to polystyrene molecular weight standards.
[5]"nd" indicates that the given value was not determined for the indicated polycarbonate terpolymer.
[6]For The term "no Tm" is used to indicate polycarbonate terpolymers which were amorphous and hence possessed no melting point (Tm).

The data for the terpolymers illustrates the general utility of the present invention in the preparation of polycarbonates comprising repeat units derived from at least three different dihydroxy aromatic compounds. The data reveal that the method may be used to prepare both crystalline (Examples 19, 20, 22, and 25) and amorphous (Examples 21, 23, and 26) polycarbonate terpolymers. The polycarbonate terpolymers possess both a high level of endcapping and very low levels of Fries product.

The invention has been described in detail with particular reference to preferred embodiments thereof, but it will be understood by those skilled in the art that variations and modifications can be effected within the spirit and scope of the invention.

What is claimed is:

1. A method of preparing a polycarbonate, said method comprising heating a mixture comprising a catalyst, at least one diaryl carbonate having structure I

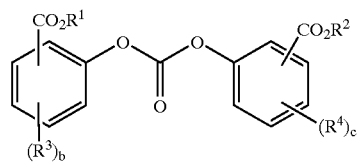

wherein
R[1] and R[2] are independently $C_1$–$C_{20}$ alkyl radicals, $C_4$–$C_{20}$ cycloalkyl radicals, or $C_4$–$C_{20}$ aromatic radicals, $R^3$ and $R^4$ are independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical, and b and c are independently integers 0–4;

and at least one dihydroxy aromatic compound selected from the group consisting of resorcinol, methylresorcinol, hydroquinone, and methylhydroquinone, said catalyst comprising at least one source of alkaline earth ions or alkali metal ions, and at least one quaternary ammonium compound, quaternary phosphonium compound, or a mixture thereof, said source of alkaline earth ions or alkali metal ions being present in an amount such that between about $1\times10^{-5}$ and about $1\times10^{-8}$ moles of alkaline earth metal ions or alkali metal ions are present in the mixture per mole of dihydroxy aromatic compound employed, said quaternary ammonium compound, quaternary phosphonium compound, or mixture thereof being present in an amount between about $2.5\times10^{-3}$ and about $1\times10^{-6}$ moles per mole of dihydroxy aromatic compound employed, to provide a product polycarbonate, said product polycarbonate comprising repeat units derived from at least one member of the group consisting of resorcinol, methylresorcinol, hydroquinone, and methylhydroquinone.

2. A method according to claim 1 wherein said product polycarbonate comprises repeat units derived from resorcinol.

3. A method according to claim 1 wherein said product polycarbonate comprises repeat units derived from methylresorcinol.

4. A method according to claim 1 wherein said product polycarbonate comprises repeat units derived from hydroquinone.

5. A method according to claim 1 wherein said product polycarbonate comprises repeat units derived from methylhydroquinone.

6. A method according to claim 1 wherein said product polycarbonate comprises repeat units derived from resorcinol and hydroquinone.

7. A method according to claim 1 wherein said product polycarbonate comprises repeat units derived from resorcinol, hydroquinone, and methylhydroquinone.

8. A method according to claim 1 wherein said product polycarbonate comprises repeat units derived from hydroquinone, and methylhydroquinone.

9. A method according to claim 1 wherein said product polycarbonate further comprises repeat units derived from at least one dihydroxy aromatic compound selected from the group consisting of bisphenols having structure II

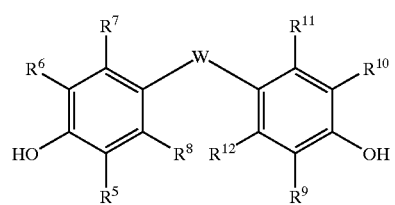

where
$R^5$–$R^{12}$ are independently a hydrogen atom, halogen atom, nitro group, cyano group, $C_1$–$C_{20}$ alkyl radical, or a $C_4$–$C_{20}$ cycloalkyl radical, or a $C_6$–$C_{20}$ aryl radical, W is a bond, an oxygen atom, a sulfur atom, a $SO_2$ group, a $C_6$–$C_{20}$ aromatic radical, a $C_6$–$C_{20}$ cycloaliphatic radical, or the group

wherein
$R^{13}$ and $R^{14}$ are independently a hydrogen atom, $C_1$–$C_{20}$ alkyl radical, $C_4$–$C_{20}$ cycloalkyl radical, or $C_4$–$C_{20}$ aryl radical, or $R^{13}$ and $R^{14}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or a combination thereof;

dihydroxy benzenes having structure III

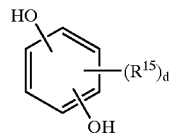

wherein
$R^{15}$ is independently at each occurrence a halogen atom, nitro group, cyano group, $C_2$–$C_{20}$ alkyl radical, $C_4$–$C_{20}$ cycloalkyl radical, or a $C_4$–$C_{20}$ aryl radical, and d is an integer from 1 to 4; and dihydroxy naphthalenes having structures IV and V

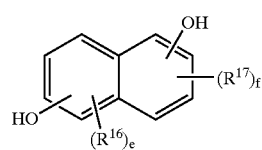

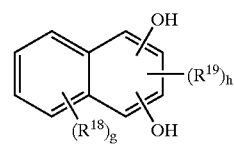

wherein
$R^{16}$, $R^{17}$, $R^{18}$ and $R^{19}$ are independently at each occurrence a halogen atom, nitro group, cyano group, $C_1$–$C_{20}$ alkyl radical, $C_4$–$C_{20}$ cycloalkyl radical, or a $C_4$–$C_{20}$ aryl radical, e and f are integers from 0 to 3, g is an integer from 0 to 4, and h is an integer from 0 to 2.

10. A method according to claim 9 wherein bisphenol II is selected from the group consisting of 2,2-bis(4-hydroxyphenyl)propane (bisphenol-A); bis(4-hydroxy-3-methylphenyl)cyclohexane; 2,2-bis(4-hydroxy-3-methylphenyl)propane; bis(4-hydroxyphenyl)methane; 1,1-bis(4-hydroxyphenyl)ethane; 2,2-bis(4-hydroxyphenyl)butane; 2,2-bis(4-hydroxyphenyl)octane; 2,2-bis(3-t-butyl-4-hydroxyphenyl)propane; 1,1-bis(3-sec-butyl-4-hydroxyphenyl) propane; 2,2-bis(4-hydroxy-3-bromophenyl)propane; 1,1-bis(4-hydroxyphenyl) cyclopentane; 1,1-bis(4-hydroxyphenyl)cyclohexane; and 4,4'-dihydroxydiphenyl ether.

11. A method according to claim 9 wherein dihydroxy aromatic compound having structure II is selected from the group consisting of bisphenol A and 4,4'-biphenol.

12. A method according to claim 9 wherein said dihydroxy benzene having structure III is selected from the group consisting of 5-phenylresorcinol, 5-butylresorcinol, 4-hexylresorcinol, 5-hexylresorcinol, ethylhydroquinone, butylhydroquinone, and phenylhydroquinone.

13. A method according to claim 11 wherein said polycarbonate comprises repeat units derived from hydroquinone and bisphenol A.

14. A method according to claim 11 wherein said polycarbonate comprises repeat units derived from resorcinol and bisphenol A.

15. A method according to claim 11 wherein said polycarbonate comprises repeat units derived from methylhydroquinone and bisphenol A.

16. A method according to claim 11 wherein said polycarbonate comprises repeat units derived from methylresorcinol and bisphenol A.

17. A method according to claim 11 wherein said polycarbonate comprises repeat units derived from resorcinol, hydroquinone and bisphenol A.

18. A method according to claim 11 wherein said polycarbonate comprises repeat units derived from resorcinol, hydroquinone, methylhydroquinone and bisphenol A.

19. A method according to claim 11 wherein said polycarbonate comprises repeat units derived from 4,4'-biphenol.

20. A method according to claim 1 wherein said quaternary ammonium compound comprises structure VI

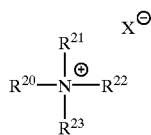

VI wherein
$R^{20}$–$R^{23}$ are independently a $C_4$–$C_{20}$ alkyl radical, $C_4$–$C_{20}$ cycloalkyl radical, or a $C_4$–$C_{20}$ aryl radical, and $X^-$ is an organic or inorganic anion.

21. A method according to claim 20 wherein $R^{20}$–$R^{23}$ are independently $C_1$–$C_5$ alkyl.

22. A method according to claim 21 wherein $R^{20}$–$R^{23}$ are each methyl radicals.

23. A method according to claim 20 wherein said anion is selected from the group consisting of hydroxide, halide, carboxylate, sulfonate, sulfate, carbonate, and bicarbonate.

24. A method according to claim 1 wherein said quaternary ammonium compound is tetramethylammonium hydroxide.

25. A method according to claim 1 wherein said phosphonium compound comprises structure VII

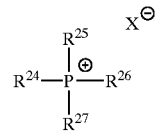

VII wherein
$R^{24}$–$R^{27}$ are independently a $C_4$–$C_{20}$ alkyl radical, $C_4$–$C_{20}$ cycloalkyl radical, or a $C_4$–$C_{20}$ aryl radical, and $X^-$ is an organic or inorganic anion.

26. A method according to claim 25 wherein $R^{24}$–$R^{27}$ are independently $C_1$–$C_5$ alkyl.

27. A method according to claim 26 wherein $R^{24}$–$R^{27}$ are each methyl radicals.

28. A method according to claim 25 wherein said anion is selected from the group consisting of hydroxide, halide, carboxylate, sulfonate, sulfate, carbonate, and bicarbonate.

29. A method according to claim 1 wherein said quaternary phosphonium compound is tetrabutylphosphonium acetate.

30. A method according to claim 1 wherein said source of alkaline earth or alkali metal ions is an alkali metal hydroxide, an alkaline earth metal hydroxide, or a mixture thereof.

31. A method according to claim 30 wherein said alkali metal hydroxide is lithium hydroxide, sodium hydroxide, potassium hydroxide, or a mixture thereof.

32. A method according to claim 1 wherein said source of alkaline earth or alkali metal ions is a salt of EDTA.

33. A method according to claim 32 wherein said salt of EDTA is EDTA magnesium disodium salt.

34. A method according to claim 1 wherein said mixture is heated to a temperature in a range between about 100° C. and about 340° C.

35. A method according to claim 34 wherein said mixture is heated to a temperature in a range between about 100° C. and about 280° C.

36. A method according to claim 35 wherein said mixture is heated to a temperature in a range between about 140° C. and about 240° C.

37. A method according to claim 1 wherein said mixture is heated at subambient pressure.

38. A method according to claim 37 wherein said pressure is in a range between about 0.00001 and about 0.9 atmospheres.

39. A method according to claim 1 wherein said mixture is heated at ambient or suprambient pressure.

40. A method according to claim 39 wherein said pressure is in a range between about 1 and about 2 atmospheres.

41. A method according to claim 1 wherein said diaryl carbonate I is bis-methyl salicyl carbonate and said product polycarbonate comprises methyl salicyl end groups.

42. A method according to claim 1 of preparing a polycarbonate, said mixture further comprising at least one exogenous monofunctional phenol.

43. A method according to claim 42 wherein said polycarbonate comprises endgroups derived from said exogenous monofunctional phenol.

44. A method according to claim 43 wherein said exogenous monofunctional phenol is selected from the group consisting of 2,6-xylenol, p-t-butylphenol, p-cresol, cardanol, p-cumylphenol, p-nonylphenol, p-octadecylphenol, 1-naphthol, and 2-naphthol.

45. A method according to claim 1 wherein said dihydroxy aromatic compound contains less than 1.0 parts per million each of sodium ion, iron and chloride.

46. A method according to claim 45 wherein said polycarbonate contains less than 1.0 parts per million each of sodium ion, iron and chloride.

47. A method according to claim 46 wherein said product polycarbonate comprises less than about 100 parts per million of an ester substituted phenol by-product.

48. A molded article prepared from the polycarbonate made by the method of claim 47.

49. A molded article prepared from a polymer blend comprising the polycarbonate prepared by the method of claim 1.

50. A method of preparing a polycarbonate comprising repeat units derived from resorcinol and bisphenol A, said method comprising heating a mixture of resorcinol and bisphenol A with from about 0.8 to about 1.10 moles of bis-methyl salicyl carbonate per mole bisphenol A and resorcinol combined, at a temperature in a range between about 140° C. and about 240° C., and a pressure in a range between about 0.01 mmHg and about 760 mmHg, in the presence of a catalyst comprising sodium hydroxide and a quaternary ammonium compound or quaternary phosphonium compound, said sodium hydroxide being present in an amount in a range between about $1 \times 10^{-5}$ and about $1 \times 10^{-8}$ moles sodium hydroxide per mole of bisphenol A and resorcinol combined, said quaternary ammonium compound or quaternary phosphonium compound being present in an amount between about $2.5 \times 10^{-3}$ and about $2.5 \times 10^{-6}$ moles of quaternary ammonium compound or quaternary phosphonium per mole of bisphenol A and resorcinol combined.

51. A method according to claim 50 wherein the quaternary ammonium compound is tetramethylammonium hydroxide.

52. A method according to claim 51 wherein the quaternary phosphonium compound is tetrabutylphosphonium acetate.

53. A method of preparing a polycarbonate terpolymer comprising repeat units derived from resorcinol, hydroquinone and bisphenol A, said method comprising heating a mixture of resorcinol, hydroquinone and bisphenol A with from about 0.8 to about 1.10 moles of bis-methyl salicyl carbonate per mole of bisphenol A, hydroquinone, and resorcinol combined, at a temperature in a range between about 140° C. and about 240° C., and a pressure in a range between about 0.01 mmHg and about 760 mmHg, in the presence of a catalyst comprising sodium hydroxide and a quaternary ammonium compound or quaternary phosphonium compound, said sodium hydroxide being present in an amount in a range between about $1 \times 10^{-5}$ and about $1 \times 10^{-8}$ moles sodium hydroxide per mole of bisphenol A, hydroquinone, and resorcinol combined, said quaternary ammonium compound or quaternary phosphonium compound being present in an amount between about $2.5 \times 10^{-3}$ and about $2.5 \times 10^{-6}$ moles of quaternary ammonium compound or quaternary phosphonium per mole of bisphenol A, hydroquinone, and resorcinol combined.

* * * * *